Jan. 19, 1943.  F. W. CURTIS  2,308,647
HYDRAULIC MACHINE TOOL
Filed June 6, 1941  4 Sheets-Sheet 1

INVENTOR
FRANK W. CURTIS
BY Chapin & Neal
ATTORNEYS

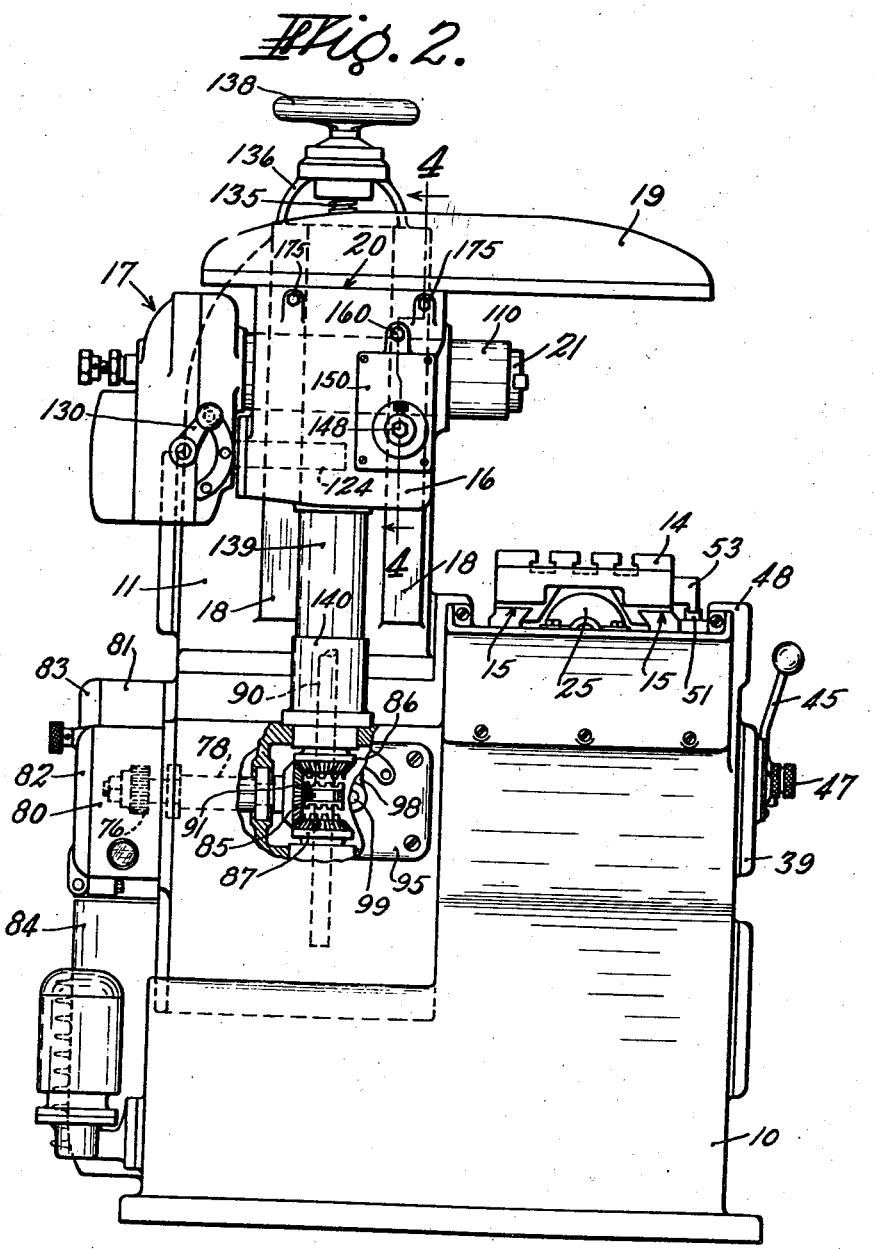

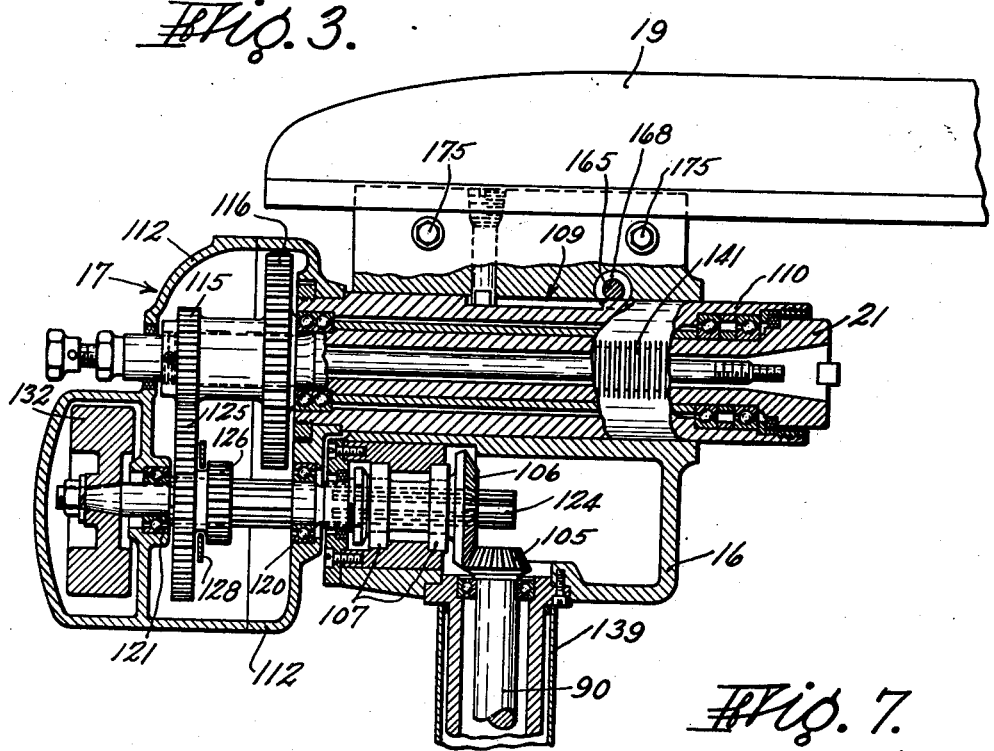
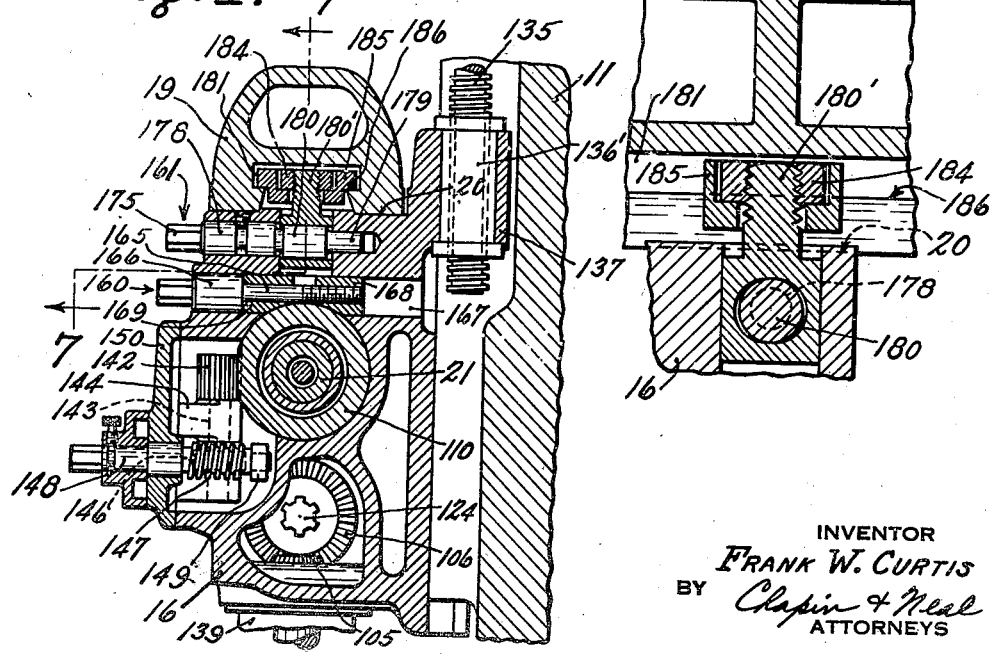

INVENTOR
Frank W. Curtis
BY Chapin + Neal
ATTORNEYS

Patented Jan. 19, 1943

2,308,647

UNITED STATES PATENT OFFICE 2,308,647

HYDRAULIC MACHINE TOOL

Frank W. Curtis, Springfield, Mass., assignor to Van Norman Machine Tool Company, Springfield, Mass., a corporation of Massachusetts Application June 6, 1941, Serial No. 396,857

11 Claims. (Cl. 90—21)

This invention relates to milling machines and in particular to hydraulic milling machines.

The main object of this invention is to provide an improved bed-type, hydraulically actuated milling machine. An additional object is to provide in a milling machine improved means for coupling a single prime mover for reciprocating the work holder and driving the spindle. A further object is to provide an improved spindle transmission having a novel arrangement of gearing for driving the spindle at various speeds. Another object is to provide a milling machine in which special provision in addition to hydraulic actuation of the table is made to prevent chattering of the cutter during work removing operations.

How I accomplish the foregoing and other and additional objects will best be understood by a reading of the specification in conjunction with the drawings, in which:

Fig. 2 is a side view of the machine of Fig. 1;

Fig. 3 is an elevation partly in section on line 3—3 of Fig. 1;

Fig. 4 is a sectional elevation substantially on line 4—4 of Fig. 2;

Fig. 7 is an enlarged sectional view substantially on line 7—7 of Fig. 4.

Figure 1:
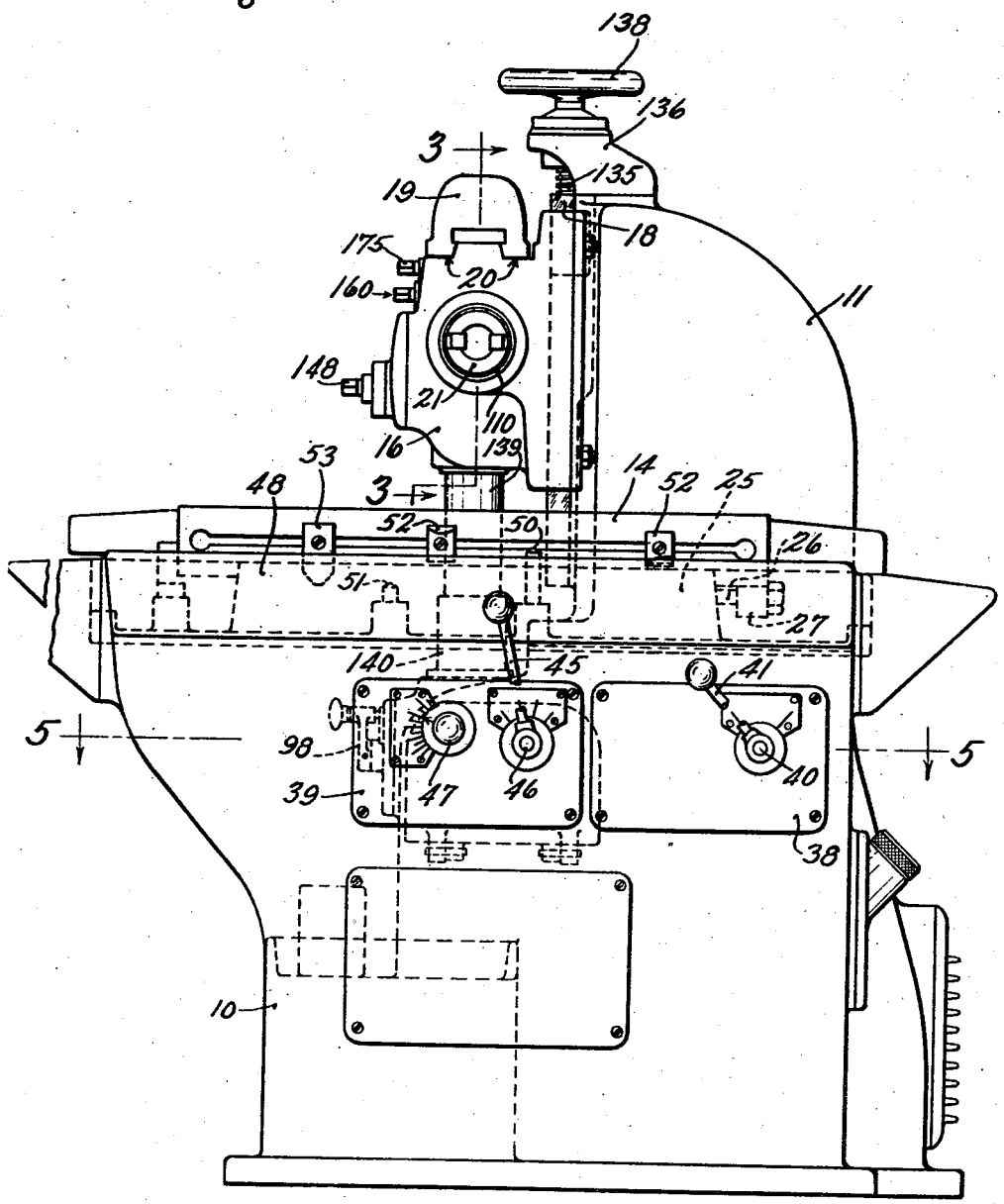
Fig. 1 is a front view of my improved milling machine.

Referring to Figs. 1 and 2 of the drawings, the milling machine consists of a bed 10 and column 11, a table 14 carried for reciprocation in a horizontal plane on the bed by means of ways 15, and a spindle carrier 16 including an axially adjustable spindle head 17 and mounted on the column on ways 18 for vertical reciprocation relative to the table. An overarm 19 sliding on ways 20 on the spindle carrier is provided to support the usual pendant (not shown) for journaling the end of a tool arbor carried by the spindle 21 of the spindle carrier. A prime mover 22, which in the machine shown is an electric motor, is carried in the bed and coupled to rotate the spindle and reciprocate the table.

Figure 5:
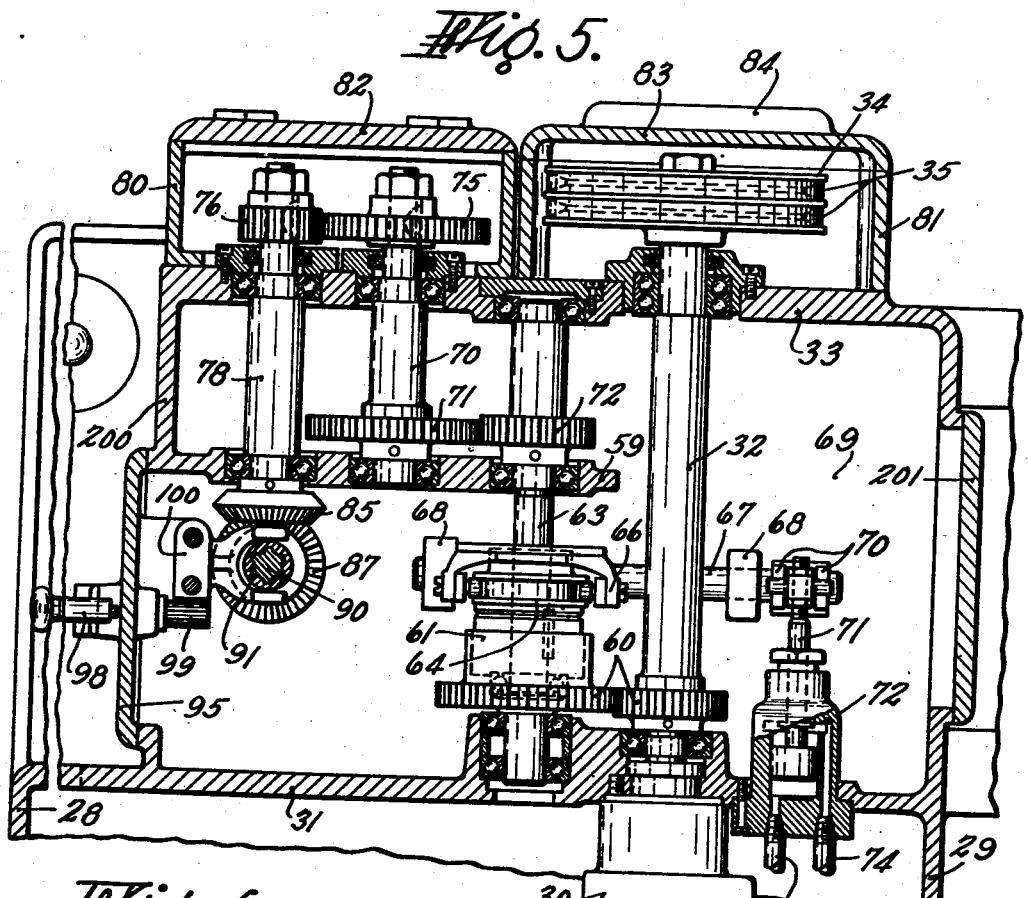
Fig. 5 is a sectional view through the column on line 5—5 of Fig. 1.
Figure 6:
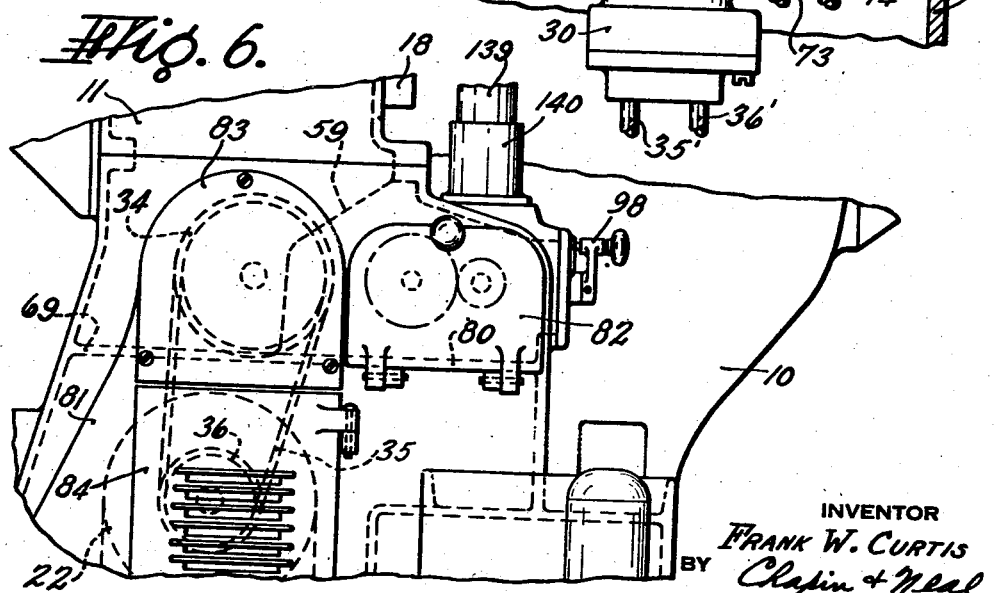
Fig. 6 is a detail of the back of the machine showing a portion of the base of the machine.

Referring to Figs. 1, 5 and 6, a cylinder 25 is suitably mounted on the bed and contains a piston (not shown) coupled by a piston rod 26 to a lug 27 depending from the table. Hydraulic fluid is supplied to the cylinder for reciprocation of the table from a pump 30 (Fig. 5) supported in a web 31 in the bed and connected directly to one end of a main driver 32 for both the table and spindle transmissions. This main driver is suitably supported on bearings in the web 31 and back wall 33 of the bed as shown, and at its opposite end beyond the back wall is provided with a pulley 34 driven by belts 35 from the drive pulley 36 of the motor 22 which also extends beyond this back wall.

Web 31 referred to above along with the walls 28 and 29 of the bed and the front wall of the bed form a reservoir from which hydraulic fluid is drawn through an inlet pipe, as pipe 35', to the pump. The fluid is then delivered through an outlet pipe 36' to distributing valve mechanisms carried on the inner face of each of two panels 38 and 39 inserted into suitable openings in the front wall of the bed. Panel 38 has mounted thereon, for swinging movement in an arc on a shaft 40 as a pivot, a spindle manual control handle 41 which may be shifted manually to adjust the valve mechanism and thereby start and stop spindle rotation. In the position of the handle shown the spindle will be stationary while if it is swung clockwise about 90° the spindle will rotate. Panel 39 carries a handle 45 which likewise is pivoted for swinging movement on a shaft 46 and which controls the valve mechanism associated with the panel 39.

This latter valve mechanism is connected to the pump 30 in a suitable manner by piping, for controlling distribution of fluid to the cylinder 25 to give various rates as well as directions of reciprocation to the table. Handle 45 has two extreme positions about 90° apart in arc and a number of intermediate positions. By swinging the handle to its extreme right or left positions the valve mechanism is adjusted to give respectively a rapid traverse forward or rapid traverse return movement of the table, while the handle may be moved to intermediate positions for stopping the table or moving it at a feed rate. Adjacent to handle 45 is a knurled knob 47 which controls the adjustment of a throttle for manual adjustment of the speed of the table during feeding movements.

The bed at the top is provided with a flange 48 forming part of a trough to receive coolant during working operations. Behind this flange and between the flange and ways 15 for the table are provided a pair of trip plungers 50 and 51 for automatic control of the rate and direction of the table motion. These plungers are controlled by dogs 52 and 53 on the table. Plunger 50 is raised or lowered by dogs 52 to mechanically shift the valve mechanism on panel 39 to change the rate of the table motion as well as to stop the table, while plunger 51 is depressed by dog 53 to move the valve mechanism to reverse the direction of table motion. In the case of reversal of the table, the valve mechanism is shifted by a servo-motor which is supplied with fluid from the pump 30 through actuation of a servo-motor valve controlled by plunger 51.

Inasmuch as the hydraulic circuit per se does not form part of this invention I will not describe in further detail the exact arrangement of parts, it being obvious that various forms of valve mechanism which are suitable for the purpose can readily be devised. One suitable arrangement is that shown in my application Serial No. 391,827, filed May 5, 1941, which has matured into Patent No. 2,302,744, of Nov. 24, 1942.

Referring to Fig. 5, the main driver 32, through gears 60, drives one member 61 of a friction clutch-brake unit of well known form and supported for rotation upon a clutch shaft 63 journaled as indicated in the web 59 located intermediate web 31, and back wall 33 of the bed. The second member 64 of the clutch unit is suitably splined on shaft 63 and may be shifted into engagement with member 61 to cause rotation of shaft 63 by a shifter fork 66. Shifter fork 66 is fixed to one end of a shaft 67 journaled in bosses 68 formed integrally with a partition 69 extending beneath shaft 67 and forming the top of the motor compartment (Fig. 6). At its opposite end shaft 67 is provided with a lever 70 forked at its upper end and connected to the piston rod 71 of a hydraulic servo-motor 72. This servo-motor is supported in web 31 and has connections 73 and 74 extending to the valve mechanism controlled by spindle control handle 41 previously referred to. The valve mechanism controls flow of liquid from the pump 30, and is arranged to direct hydraulic pressure to either side of the piston of the servo-motor while exhausting fluid from the opposite side. Thus clutch shaft 63 can be either rotated or held stationary by shifting the handle 41. For further details of one suitable arrangement of valve mechanism reference should be had to my copending application referred to.

Suitably journaled for rotation in web 59 and the back wall 33 is a first pickoff gear shaft 70 provided at its front end with a gear 71 meshing with another gear 72 fixed to clutch shaft 63. At its opposite end, shaft 70 extends beyond the rear wall 33 of the bed and is provided with a pickoff gear 75 meshing with a complementary pickoff gear 76 carried on one end of a second pickoff gear shaft 78 likewise journaled in web 59 and the back wall 33. By interchanging pickoff gears 75 and 76 on their respective shafts as well as by replacing them with gears having a different ratio the speed of rotation of shaft 78 can be varied.

To prevent injury to the operator, the bed adjacent both the extending ends of the pickoff gear shafts 70 and 78 and the extending ends of the main driver 32 and motor shaft is provided with guard casings 80 and 81 having suitable covers 82, 83, and 84 which may be opened to permit access to the ends of the shafts (Figs. 5 and 6).

Shaft 78 is coupled to drive the spindle 21 as follows. At its forward end this shaft has fixed thereto a bevel gear 85 meshing with a pair of oppositely rotating bevel gears 86 and 87, (Fig. 2), having their hubs journaled for rotation in webs in the bed. A spline shaft 90 mounted on bearings in the spindle carrier 16 (Fig. 3), extends downwardly through the hubs of the bevel gears and has splined to it a clutch member 91 positioned between the bevel gears 86 and 87. Clutch member 91 is provided with clutch teeth as shown adapted to be selectively engaged with complementary clutch teeth formed on the bevel gears to thus impart opposite directions of rotation to the shaft 90. A cover plate 95 closes an opening in the bed adjacent the bevel gears 86 and 87 and carries a handle 98, see Figs. 2 and 5, which is pivoted on a shaft 99 carrying suitable shifter fork mechanism 100 for engaging and shifting clutch member 91 into engagement for rotation from either gear 86 or 87.

At its upper end spline shaft 90 (Fig. 3) is provided with a bevel gear 105 which engages a bevel gear 106 having an elongated hub and journaled by bearings 107 in the spindle carrier, as shown, and at right angles to shaft 90. Mounted for sliding motion parallel to gear 106 and in a bore 109 in the spindle carrier is a sleeve 110 of the spindle head 17. At one end this sleeve supports a gear case 112 and also has journaled for rotation in its bore, the spindle 21. As shown the spindle extends at one end into the gear case and carries for rotation therewith a gear couplet consisting of gears 115 and 116. Journaled parallel to the spindle and in bearings 120 and 121 in the gear case is a shaft 124 having one end extending through the hub of the gear 106 and splined to engage complementary splines in the hub of this gear. Intermediate bearings 120 and 121 the shaft is splined as shown and carries a shiftable gear couplet including gears 125 and 126 for respectively engaging gears 115 and 116 to drive the spindle at respectively a fast or a slow rate from shaft 124. To selectively engage the gears 125 and 126 a shifter fork 128 engaging the couplet as shown is suitably coupled for operation by a shifter handle 130, see Fig. 2.

In order to insure smooth operation of the spindle and prevent chattering, shaft 124 is extended as shown and carries a flywheel 132. This arrangement of having the flywheel mounted on shaft 124 is of considerable advantage due to the fact that the flywheel is rotating at a constant speed regardless of whether the fast speed gears 115, 125 or slow speed gears 116, 126 are engaged. With this arrangement the flywheel can be designed to give the best inertial effect to the spindle drive based on the speed of rotation of shaft 124 and the dynamic balance of the parts and this effect will not be affected by varying the spindle speed through shifting of gears 125, 126. This is to be differentiated from mounting the flywheel directly to the spindle where if the flywheel gives the desired effect at slow spindle speeds it is likely to rotate fast enough to cause serious dynamic unbalance when the speed of the spindle is increased.

From the foregoing it will be clear that the splined connection of shaft 90 with bevel gears 86 and 87 will permit the spindle carrier to be shifted vertically on ways 18 while the splined connection of shaft 124 with gear 106 permits the sleeve 110 and consequently the spindle head 17 to be slid along bore 109 to adjust the spindle axially. Manual means is provided for each of these adjustments. Thus in the case of the spindle carrier, a feed screw 135, Figs. 1 and 4, is journaled for rotation in a bracket 136 at the top of the column 11 and threadably engages a fixed nut 136' carried in a lug 137 formed preferably integrally with the spindle carrier. To rotate the screw a suitable hand wheel 138 is fixed to the upper end thereof. As shown in Figs. 2 to 3, means including a sleeve 139 supported in the spindle carrier in axial alignment with shaft 90 and interfitting with a sleeve 140 carried by the bed is preferably provided to exclude dirt and protect the operator while permitting this adjustment.

For adjustment of the spindle head, sleeve 110 (Figs. 3 and 4) is provided with rack teeth 141 engaged by complementary teeth 142 formed on one end of a short shaft 143 journaled in a boss 144 in the spindle carrier. At its lower end this shaft has fixed thereto a worm wheel 146 which meshes with a worm 147 mounted for rotation with a shaft 148 journaled at one end in a boss 149 in the spindle carrier and intermediate its ends in a cover plate 150 attached to the carrier. The shaft has a squared end as shown to which may be applied a handle for turning the shaft.

As shown in Figs. 3 and 4, the spindle head 17 and overarm 19 may each be locked in their adjusted positions by binders 160 and 161. Binder 160 consists of a bolt 165 having at one end an enlarged head 166 provided with a squared end with the head 166 fitting within a bore 167 extending transversely above the sleeve 110. At its opposite end the bolt is threaded into a cylindrical nut 168 positioned in the bore beyond the axis of the sleeve and has slidable thereon a collar 169 located between the enlarged head 166 and the axis of the sleeve 110. By tightening the bolt, the nut 168 and collar 169 are drawn into frictional engagement with the sleeve 110.

In the case of the overarm binder 161, a short shaft 175 having a squared end is provided with two concentric bearing surfaces 178 and 179 which are journaled as shown in a bore in the spindle carrier. Intermediate the bearing surfaces, this shaft has an integral eccentric 180 engaging a slot in a connecting rod 180' vertically slidable in a slot in the spindle carrier. At its upper end, this connecting rod extends into a cavity 181 formed in the bottom of the overarm and has threaded thereto a nut 184. This nut engages with its under surface a shoe 185 which in turn engages as at 186 with shoulders in the overarm. By rotating shaft 175, connecting rod 180' will draw the shoe downwardly forcing the overarm against the ways 20 in the spindle carrier.

Among the advantages due to the structure disclosed is the separation in the bed of the mechanical spindle transmission and hydraulic table transmission. Thus, referring to Fig. 5, the web 31, the back wall, 33, and the side walls 200 and 201 of the bed along with the partition 69, form a mechanical transmission compartment while the web 31 along with walls 28 and 29 and the front wall of the bed forms a sump for the hydraulic pump 30.

With the arrangement shown, lubricant in the mechanism transmission compartment is completely isolated from the sump for the hydraulic pump 30 and there is no danger of comingling of the two. This desirable result is further insured by having both the pump 30 and the servomotor 72 supported in the web 31 with their connecting pipes 35', 36', 73 and 74 located in the sump.

Another advantage is in the provision in the spindle transmission of the reverser consisting of clutch member 91 and gears 85, 86, and 87 driven through change speed mechanism consisting of pickoff gearing 75 and 76 and driving the change gearing carried in the gear casing in the spindle carrier 16. This permits for simpler and more varied adjustment of speed change for spindle rotation than has been heretofore possible in similar milling machines.

I claim:

1. In a milling machine, a bed, a column extending upwardly from the bed, a spindle carrier supported on the column for vertical movement, a spindle in the carrier and mounted for axial movement with respect to the carrier, a table carried on the bed for reciprocation transversely to the axis of the spindle, a prime mover in the bed, a main drive shaft driven from the prime mover, an hydraulic transmission for said table and including a pump coupled directly to the end of the main drive shaft, and a spindle transmission driven from the main drive shaft and driving the spindle, said spindle transmission comprising; a first and second shaft, a first and second spline shaft, clutch means on the first shaft for selectively coupling said shaft for rotation from the main drive shaft, change gearing connecting the first and second shaft for rotation and including pick-off gears, a spindle reversing clutch mechanism connecting the second shaft and said first spline shaft for opposite directions of rotation of the latter, gearing between said first and second spline shafts, and change speed gearing connecting said second spline shaft and the spindle.

2. In a milling machine, a bed, a column extending upwardly from the bed, a spindle carrier supported on the column for vertical movement, a spindle in the carrier mounted for axial movement with respect to the carrier, a table carried on the bed for reciprocation transversely to the axis of the spindle, a prime mover in the bed, a main drive shaft driven from the prime mover, an hydraulic transmission for the table and including a pump coupled directly to the end of the main drive shaft, and a spindle transmission driven from the main drive shaft and driving the spindle, said spindle transmission comprising; a first and second shaft, a first and second spline shaft and the spindle in the order named, clutch means on the first shaft for selectively coupling said shaft for rotation from the main drive shaft, change gearing connecting the first and second shaft for rotation and including pick-off gears, a spindle reversing clutch mounted on the first spline shaft and connecting the second shaft and said first spline shaft for opposite directions of rotation of the latter, gearing between said first and second spline shafts, a flywheel carried on said second spline shaft, and change speed gearing between the second spline shaft and the spindle.

3. In a milling machine, a bed, a column extending upwardly from the bed, a spindle head carrier supported on the column for vertical movement, a spindle head mounted in the carrier and adjustable transversely of the direction of carrier movement, a spindle supported in the spindle head with its axis parallel to the direction of spindle head adjustment, a table carried on the bed for reciprocation transversely to the axis of the spindle, a prime mover in the bed, a main drive shaft driven from the prime mover, an hydraulic transmission for said table and including a pump coupled directly to the end of the main drive shaft, and a spindle transmission driven from the main drive shaft, said spindle transmission comprising; a first and a second shaft in the bed, a first spline shaft carried in the spindle carrier and slidable with respect to the bed, a second spline shaft mounted in the spindle head and slidable with respect to the spindle carrier, and the spindle, clutch means on the first shaft for selectively coupling said shaft for rotation from the main drive shaft, change gearing connecting the first and second shaft for rotation and including pick-off gears, a spindle reversing clutch mechanism mounted in the bed and splined to the first spline shaft and selectively connecting the second shaft and first spline shaft for opposite directions of rotation of the latter, gearing mounted in the spindle carrier and splined to the second spline shaft and connecting the first and second spline shafts, and change gearing carried by the spindle head and connecting the second spline shaft and the spindle.

4. In a milling machine, a bed, a column extending upwardly from the bed, a spindle head carrier supported on the column for vertical movement, a spindle head mounted in the carrier and adjustable transversely to the direction of carrier movement, a spindle in the spindle head, a table carried on the bed for reciprocation transversely to the axis of the spindle, a prime mover in the bed, a main drive shaft driven from the prime mover, an hydraulic transmission for said table and including a pump coupled directly to the end of the main drive shaft, and a spindle transmission driven from the main drive shaft, said spindle transmission comprising; a first and a second shaft in the bed, a first spline shaft carried in the spindle carrier and slidable with respect to the bed, a second spline shaft mounted in the spindle head and slidable with respect to the spindle carrier and the spindle, clutch means on the first shaft for selectively coupling said shaft for rotation from the main drive shaft, change gearing connecting the first and second shaft for rotation and including pick-off gears, a spindle reversing clutch mounted in the bed and selectively connecting the second shaft and first spline shaft for opposite directions of rotation of the latter, gearing mounted in the spindle carrier in slidable relation to the second spline shaft and connecting the first and second spline shafts, a flywheel mounted in the spindle head and carried by the second spline shaft and change gearing carried by the spindle head and connecting the second spline shaft and the spindle.

5. In a milling machine, a bed, a column extending upwardly from the bed, a spindle carrier mounted on the column for vertical movement, a spindle in the carrier mounted for axial movement with respect to the carrier, a table carried on the bed for reciprocation transversely to the axis of the spindle, a prime mover in the bed, a main drive shaft driven from the prime mover, an hydraulic transmission for said table and including a pump coupled directly to the end of the main drive shaft, and a spindle transmission driven from the main shaft, said spindle transmission comprising; a first and a second shaft, a first and a second spline shaft and the spindle in the order named, clutch means on the first shaft for selectively coupling said shaft for rotation from the main drive shaft, an hydraulic servo-motor for said clutch and operated by fluid from the pump, change gearing connecting the first and second shafts for rotation and including pick-off gears, a spindle reversing clutch connecting the second shaft and first spline shaft for opposite directions of rotation of the latter, gearing between the first and second spline shafts and change speed gearing connecting said second spline shaft and the spindle.

6. In a milling machine, a bed, a column extending upwardly from the bed, a spindle head carrier mounted on the column for vertical movement, a spindle head mounted in the carrier, a spindle in the spindle head, the spindle head being adjustable transversely of the direction of motion of the spindle carrier to move the spindle axially, a table supported on the bed for reciprocation transversely to the axis of the spindle, a prime mover in the bed, a main drive shaft driven from the prime mover, an hydraulic transmission for the table and including a pump coupled directly to the end of the main drive shaft, and a spindle transmission driven from the main drive shaft and comprising; a first and a second shaft in the bed, a first spline shaft supported in spindle carrier and extending into the bed in slidable relation thereto, a second spline shaft mounted in the spindle head and slidable with respect to the spindle carrier and the spindle, clutch means on the first shaft for selectively coupling said shaft for rotation from the main drive shaft, an hydraulic servo-motor for said clutch and operated by fluid from the pump, change gearing connecting the first and second shaft for rotation and including pick-off gears, a spindle reversing clutch mounted in the bed and selectively connecting the second shaft and the first spline shaft for opposite directions of rotation of the latter, gearing mounted in the spindle carrier in slidable relation to the second spline shaft and connecting the first and second spline shafts and change gearing carried by the spindle head and connecting the second spline shaft and the spindle.

7. In a milling machine having a bed, a column extending upwardly from the bed, a table supported for reciprocation on the bed, a spindle carrier supported on the column for vertical reciprocation and a spindle in the carrier supported for axial adjustment transversely to the direction of table reciprocation; an hydraulic fluid sump and a spindle transmission compartment in the bed and separated by a dividing wall, an hydraulic transmission for reciprocating the table including a pump secured to said wall and extending into the sump, a spindle transmission for rotating the spindle and in part located in the compartment, a main drive shaft in the compartment and having one end extending through said wall and directly connected to the pump for rotating the same, connections between the main drive shaft and spindle transmission for driving the latter and including a spindle clutch in the compartment, an hydraulic servo-motor for operating said spindle clutch and supported on said wall and extending into the sump and connections within said sump for directing fluid to and from said servo-motor.

8. In a milling machine having a bed, a table reciprocably mounted on the bed, a column, a spindle carrier vertically movable on the column, a spindle head horizontally adjustable in the spindle carrier transversely of the table, and a spindle in the head; a prime mover, speed change gearing in the bed, a vertical shaft extending from the bed to the spindle carrier and having an extensible connection, a horizontal shaft on the spindle carrier, gearing connecting the vertical shaft with the change speed gearing and with the horizontal shaft, a flywheel on the horizontal shaft, and change speed gearing between the horizontal shaft and the spindle.

9. In a milling machine having a bed, a table reciprocably mounted on the bed, a column, a spindle carrier vertically movable on the column, a spindle head horizontally adjustable in the spindle carrier transversely of the table and a spindle in the spindle head; a prime mover in the bed, and a spindle transmission connecting the prime mover and the spindle and including a reversing clutch in the bed, change speed gearing connecting the prime mover and reversing clutch and gearing in the spindle head connecting the reversing clutch and the spindle including a pair of relatively slidable gear clusters.

10. In a milling machine having a bed, a table reciprocably mounted on the bed, a column, a spindle carrier vertically movable on the column, a spindle head horizontally adjustable in the spindle carrier transversely to the table and a spindle in the spindle head; a prime mover in the bed and a spindle transmission connecting the prime mover and the spindle and including a reversing clutch and a motion interrupting clutch in the bed, gearing connecting the motion interrupting clutch and the prime mover, change speed gearing connecting the motion interrupting clutch and the reversing clutch and gearing in the spindle head connecting the reversing clutch and the spindle including a pair of relatively slidable gear clusters.

11. In a milling machine having a bed, a table reciprocably mounted on the bed, a column, a spindle carrier vertically movable on the column, a spindle head horizontally adjustable in the spindle carrier transversely to the table and a spindle in the spindle head; a prime mover in the bed, a main driver driven from the prime mover, a table transmission driven from the main driver and including a pump directly connected to the main driver, a spindle transmission driven from the main driver and including a motion interrupting clutch connected to the main driver, a reversing clutch, change speed gearing connecting the reversing clutch and motion interrupting clutch, change speed gearing in the spindle head connected to drive the spindle, and connections between the last mentioned change speed gearing and the reversing clutch, fluid operated power means for engaging the motion interrupting clutch and connections for operating said power means from the pump.

FRANK W. CURTIS.